United States Patent [19]

Mackrle et al.

[11] 4,008,153
[45] Feb. 15, 1977

[54] REACTOR FOR PURIFICATION OF WATER BY FLUID FILTRATION

[75] Inventors: Svatopluk Mackrle, Brno; Vladimir Mackrle, Prague; Oldrich Dracka, Brno, all of Czechoslovakia

[73] Assignee: Agrotechnika, narodny podnik, Zvolen, Czechoslovakia

[22] Filed: Apr. 29, 1975

[21] Appl. No.: 572,748

[30] Foreign Application Priority Data

Apr. 29, 1974 Czechoslovakia ................ 3061/74

[52] U.S. Cl. ............................. 210/208; 210/219; 210/221 R; 210/261
[51] Int. Cl.² ............................................ C02B 3/06
[58] Field of Search ........ 210/20, 208, 219, 221 R, 210/256, 261, 319

[56] References Cited

UNITED STATES PATENTS

| | | | |
|---|---|---|---|
| 2,413,692 | 1/1947 | Crowther | 210/208 X |
| 2,886,175 | 5/1959 | Kalinske | 210/208 |
| 3,043,433 | 7/1962 | Singer | 210/14 X |
| 3,403,096 | 9/1968 | Mackrle et al. | 210/261 X |
| 3,630,498 | 12/1971 | Bielinski | 210/219 X |
| 3,850,810 | 11/1974 | Teodoroiu | 210/208 |

FOREIGN PATENTS OR APPLICATIONS 709,174    5/1954    United Kingdom ............... 210/208

*Primary Examiner*—Charles N. Hart
*Assistant Examiner*—Robert H. Spitzer

[57] ABSTRACT

A reactor, comprising a homogenizing, separating and thickening space has at the bottom a homogenizing space narrowing toward the top and passing over a narrowed opening at the top into a separating space, widening toward the top, with a thickening space connected to the separating space, situated around both these spaces.

7 Claims, 1 Drawing Figure

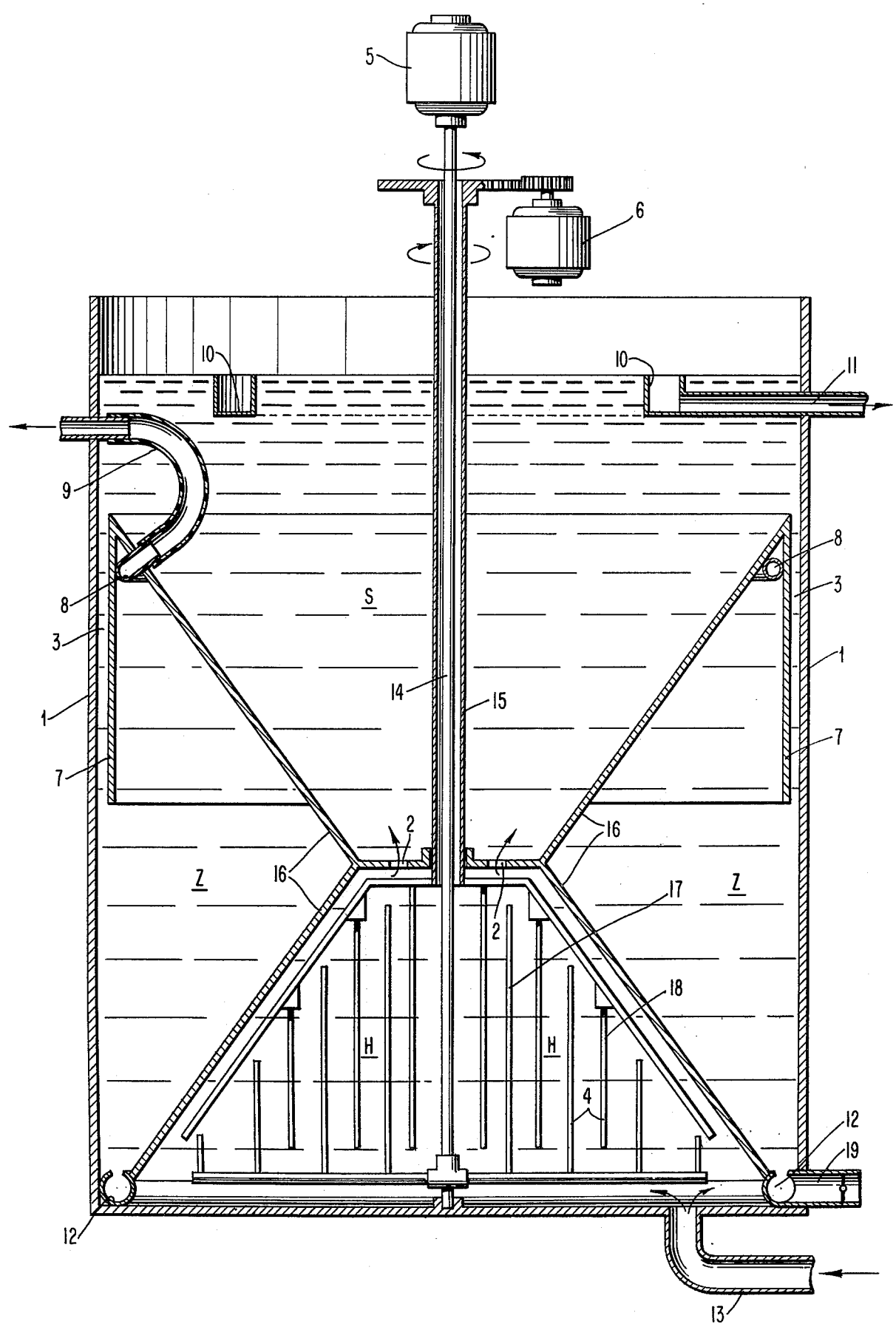

REACTOR FOR PURIFICATION OF WATER BY FLUID FILTRATION

BACKGROUND OF THE INVENTION

This invention relates to a reactor for purification of water by fluid filtration. It is designed for chemical purification of water with homogenization of the created floccular suspension and with separation of this suspension by fluid filtration.

For separation of floccular suspensions generated in the course of the treatment and cleaning of water, reactors with fluid filtration using a perfectly floating fluid floccular layer in the separating space are at present the most efficient arrangements. The efficiency of fluid filtration can be thereby substantially increased by homogenizing the floccular suspension prior to its entrance into the space for fluid filtration. The homogenizing is accomplished by a mechanical movement of a homogenizer, which creates in the homogenizing space a suitable turbulence to which the water with the suspension is exposed for a sufficient time interval (about 15 minutes) in order to create conditions for sufficient influencing of the mixture. The size of the homogenizing space must also correspond to the time interval of the homogenizing action; the size of the homogenizing space is comparable with the size of the separating space. The homogenization creates, in the case of fluid filtration, a more homogenous and a more compact layer with better characteristics of sedimentation. It eliminates the dependence of the efficiency of fluid filtration on the season of the year and enables an effective application of polycoagulants, which improve the efficiency of separation.

Due to a number of drawbacks connected with the separate arrangement of the homogenizing space from the arrangement for separation of the suspension, arrangements are used wherein the homogenization and separation spaces are combined in a compact reactor. Two types of reactors of this kind can be mentioned, namely reactors with a vertical homogenizer axis and reactors with a horizontal homogenizer axis. In both cases the homogenizing space is situated substantially centrally in the reactor. In the case of arrangements with a vertical axis of the homogenizer, the homogenizing space usually has the shape of a cylinder or of a frustrum of a cone, and at its bottom part is connected with the bottom of the separating space. The treated water flows through the homogenizing space from top to bottom and its direction of flow turns upwards in the course of its passage into the separating space. Arrangements with a horizontal axis of the homogenizer have a homogenizing space of the shape of a horizontal or lying prism or cylinder and is connected either directly or by means of lateral connecting channels with the bottom of the separating space. In the first case the treated water flows radially through the homogenizing space; in the second case the water flows along the axis of the homogenizing space and in the opposite direction through the connecting channels.

All of these arrangements have different drawbacks. As the maximum turbulence for homogenizing is optimal at the start with subsequent reduction thereof in the course of this process, the shapes of the homogenizing spaces and the directions of flow therein are in actual arrangements not advantageous for an efficient homogenizing in a different way. The most unfavorable conditions in this regard are for homogenizing spaces in the shape of a frustrum of a cone with a flow from the top to the bottom, and for a prism or cylinder with a horizontal axis and a radial direction of flow.

This drawback can be eliminated by dividing the homogenizing space into a number of sections and by using a number of mechanical homogenizers with different moving speeds; this solution, however, is complicated and expensive. Another drawback of these arrangements is the substantial reduction of the efficiency of separation when starting the operation, before a fluid filtration layer is formed in the separating space after the so-called "starting period".

Arrangements with vertical axes and arrangements with horizontal axes of the homogenizer with a longitudinal flow have an additional drawback in their limitation as to variations of the output within the range from 50 to 100 percent. In case variations surpass these limits, operating failures occur due to choking of the connection between the homogenizing space and separating space by sludge from the separating space. Arrangements with a cylindrical homogenizing space with a vertical axis have the additional drawback of a reduction of the separating surface, thus reducing the output for the overall extent of the surface of the arrangement. Finally, small reactors have another drawback; by reason of design arrangements with a vertical axis of the homogenizing space, these reactors have the water inlet leading into the separating space so narrow that there is a danger of choking, requiring solutions with additional arrangements, for instance, the added step of rinsing. Arrangements with a horizontal axis of the homogenizing space have, due to the complexity of their design, higher first costs than do those arrangements with a vertical axis of the homogenizing space.

SUMMARY OF THE INVENTION

It is an object of this invention to mitigate to a high degree the above-outlined drawbacks and to provide an arrangement for the purification of water by fluid filtration, which operates efficiently and without the danger of choking passages over wide ranges of output. The reactor comprises a tank with a vertical axis, in which homogenizing, separating and thickening spaces are formed by inserted walls, whereby the homogenizing space is situated at the bottom of the tank and has the shape of an upturned diffusor. The water flows substantially upwards and in the homogenizing space passes over at the top of the homogenizing space through a passage for the treated medium into a separating space. The separating space has the shape of a diffusor and is situated substantially above the homogenizing space, whereas the thickening space is defined by walls of both the homogenizing and separating diffusors and the wall of the reactor tank, and is connected with the upper part of the separating space by a passage for the treated medium. The homogenizing space is provided with a mechanical homogenizer composed of two coaxial elements having substantially the shape of rakes engaging one into the other and rotated in opposite directions so that the resulting integral impulse transmitted to the liquid is substantially equal to zero.

The reactor according to this invention has a number of advantages. The shape of the homogenizing space and the direction of flow of the liquid therein enable the achievement with a single homogenizer of a nearly optimum course of the intensity of turbulence in the course of passage of the liquid. Due to the subsequently reducing surface area of the homogenizing space in the direction of the liquid flow, the intensity of turbulence acting on the throughgoing liquid is subsequently reduced at the given rotating speed. It is therefore possible to achieve for the generated suspension better separating conditions than with other arrangements and consequently to improve the separating efficiency and to increase the output of the reactor. The prolongation of the time interval within which the suspension remains in the homogenizing space when starting the operation, due to the fact that gravitational forces are acting on the suspension against the direction of flow of the liquid and thus slow down its passage through the homogenizing space, with respect to the passage of the liquid is equally advantageous. When starting the operation, the suspension is concentrated in the homogenizing space, and only a concentrated and well-homogenized suspension reaches the separating space. Here a fluid filtration layer is immediately formed due to a sufficient concentration of the suspension. The temporary reduction of the separating efficiency at the start of operation is thus suppressed.

Another advantage is the acceleration of the orthokinetic coagulation in the homogenizing space, caused by the mentioned increase of concentration of the suspension in the homogenizing space, further improving the separating efficiency and output of the arrangement. This advantage is particularly evident with some cleaning processes, for instance, when softening water, where the increased concentration of the suspension in the homogenizing space speeds up the contact reaction. An advantage of this reactor is, furthermore, the possibility of fluctuation of the whole output range from zero to 100 percent without affecting the reliability of operation of the arrangement. This is due to the fact that, in the case of a reduction of the output, a part of the fluid filtration layer falls back from the separation into the homogenizing space where it is, by homogenization, maintained in such a shape that in case of an increased output, it passes immediately over into the separating space, forming here the required part of the fluid filtration layer.

A further advantage of the reactor according to this invention is that it also enables for small arrangements from a relatively wide passage into the separating space, thus eliminating the danger of the choking of this passage and thus increasing the reliability of operation. An advantage is also that the reactor according to this invention more advantageously utilizes the whole reactor space, thus increasing the output per specific volume, this effect particularly appearing in large reactors. The reactor according to this invention also enables an easy reconstruction of many arrangements which are already in operation. Thus a substantial increase of the output of existing arrangements can be achieved at relatively low cost.

The described advantages lead to enlarged possibilities of application of the reactor even for plants with fluctuating output, as for instance for additional chemical treatment of biologically cleaned waste waters and for plants with interrupted operation, such as plants with a single shift operation.

The main feature of the invention consists in the fact that the homogenizing space of the reactor, into which raw water is supplied, has the shape of a truncated cone or pyramid narrowing toward the top, to which a separating space is joined by means of a narrowed passage, the separating space having the shape of a truncated cone or pyramid widening toward the top, whereby a thickening space is connected with the separating space via a connecting channel formed by a guiding wall and the wall of the reactor tank.

DESCRIPTION OF THE DRAWING

The sole FIGURE of the drawing is a view in sectional elevation of an exemplary embodiment of the reactor according to this invention.

DESCRIPTION OF PREFERRED EMBODIMENT

The reactor as shown in the drawing comprises a cylindrical tank 1 wherein a homogenizing space H is provided advantageously at the bottom of the tank, with a separating space S above the homogenizing space H and finally a thickening space Z arranged so as to surround both the homogenizing space H and the separating space S. The thickening space Z is limited by partition walls 16 defining both the homogenizing space H and the separating space S, by the wall of the cylindrical tank 1 and by a vertical guiding wall 7, connected to the partition wall 16 of the separating space S. The homogenizing space H has the shape of a truncated cone or pyramid, narrowing toward the top. The separating space S also has in part the shape of a truncated cone or pyramid which, however, widens toward the top and passes over into a cylindrical or primmatic shape in the upper part. The homogenizing space H which is connected with the separating space S is provided with a mechanical homogenizer 4 in the form of two oppositely rotating interdigitating rakes 17, 18, each of which is connected to its respective driving shaft 14 and 15 respectively, each shaft being driven by its own motor 5, 6 or by a common motor with the respective transmission gears (not shown).

The homogenizing space H is connected with the separating space S by at least one narrowed passage 2; the separating space S is connected with the thickening space Z by a connecting channel 3. A ring-shaped collecting pipe 8 is arranged in the upper part of the thickening space Z provided with a sucking off tubing 9 for the water. The separating space S is provided in its upper part with one or more overflow troughs 10 and with a discharge conduit 11 for the cleaned water. A sludge discharge tubing 12 with a sludge discharge 19 are in the lower part of the thickening spaces Z. The supply 13 of raw water terminates at the bottom of the homogenizing space near its circumference.

The reactor according to this invention operates as follows:

Raw water, already containing the dosed coagulation agents, is supplied via the supply 13 to the homogenizing space H. The oppositely rotating rakes 17, 18 generate a suitable turbulence in the mechanical homogenizer 4 promoting the creation of a floccular suspension without creating disturbing streams of the water, since the resulting integral impulse transmitted to the liquid by the counterrotating interdigitating rakes 17, 18 is substantially equal to zero. The water therefore flows substantially upwards in the homogenizing space H due to the termination of the supply 13 of raw water at the bottom, without any transverse streaming. Due to the conical shape of the homogenizing space H, the treated water is exposed in the course of its passage through the homogenizing space H to a gradually reducing intensity of turbulence resulting in improved sedimentation characteristics of the created suspension. As the treated water flows upwards, the forces of gravitation acting on the suspension contribute to a prolongation of the time interval in which the suspension remains in the homogenizing space H, thus prolonging the time of the action of turbulence on the suspension; particularly when starting the operation, the starting period of the reactor is reduced.

The treated water with the homogenized suspension enters via the narrowed passage 2 in the separating space S. In the conically widening separating space S a perfectly floating fluid layer of the floccular suspension having the property of a filter is created in the raising stream, where the suspension generated in the homogenizing space H is retained. A part of the cleaned water with the excess suspension is sucked on by the connecting channel 3 into the thickening space Z. Here the direction of flow of the water with the surplus suspension is rectified by the guiding wall 7 into the lower part, where the suspension is sedimenting and is thickened. The simultaneously sucked in water remains in the upper part of the thickening space Z and is taken away from the reactor by the sucking off tubing 9. The thickened sludge is periodically discharged via the sludge discharge tubing 12 and by the sludge discharge 19. The clarified water is collected in the upper part of the separating space S by the overflow troughs 10 and is removed via the clean water discharge 11.

Although the invention is illustrated and described with reference to a single preferred embodiment thereof, it is to be expressly understood that it is in no way limited to the disclosure of such a single preferred embodiment, but is capable of numerous modifications within the scope of the appended claims.

What is claimed is:

1. In a reactor for the purification, by fluid filtration of water introduced into the reactor via a first inlet conduit, the reactor comprising a vertically oriented tank, first partition means supported in an upper portion of the tank for defining a separating zone, second partition means supported in a lower portion of the tank beneath and in communication with the separating zone and including a pair of upwardly and inwardly extending oblique walls, rotatable impeller means disposed between the oblique walls of the second partition means to define a homogenizing zone, means including an upper apertured wall of the second partition means for effecting communication of liquid in the homogenizing zone with the separating zone, the portion of the tank extending outwardly of the first and second partition means defining a thickening zone, and third partition means extending into the thickening zone from an outer portion of the top of the first partition means, the improvement wherein the first partition means includes a pair of downwardly and inwardly extending oblique walls terminating in contact with the upper end of the upwardly and inwardly extending walls of the second partition means; wherein the second partition means define a closed chamber isolated from the remaining zones within the tank except through the upper apertured wall; and wherein the reactor further comprises means for connecting the discharge end of the first inlet conduit to the interior of the closed chamber.

2. A reactor as defined in claim 1, further comprising a sludge discharge tube communicating with the bottom of the thickening zone.

3. A reactor as defined in claim 1, further comprising a collecting trough disposed in the upper portion of the separating zone, and a clean water discharge conduit communicating with the collecting trough.

4. A reactor as defined in claim 1, in which the impeller means comprises a pair of interdigitating rakes, and means for individua-ly rotating the rakes of the impeller means in respectively opposite directions.

5. A reactor as defined in claim 1, in which the tank has a substantially cylindrical shape, and in which the oblique walls of the respective separating and homogenizing zones define truncated cones.

6. A reactor as defined in claim 1, in which the tank has a substantially prismatic shape, and in which the oblique walls of the respective separating and homogenizing zones define truncated pyramids.

7. A reactor as defined in claim 1, further comprising collection and suction conduit means communicating with the upper portion of the thickening zone.

* * * * *